No. 803,584. PATENTED NOV. 7, 1905.
J. W. HALL.
FLUID PRESSURE POWER TRANSMISSION APPARATUS.
APPLICATION FILED MAR. 14, 1903.

No. 803,584. PATENTED NOV. 7, 1905.
J. W. HALL.
FLUID PRESSURE POWER TRANSMISSION APPARATUS.
APPLICATION FILED MAR. 14, 1903.

Witnesses:
John Enders Jr.
Geo. C. Davison

Inventor:
John William Hall,
By Dyrenforth, Dyrenforth & Lee
Attys.

Fig.3 ated Nov. 7, 1905.

UNITED STATES PATENT OFFICE.

JOHN WILLIAM HALL, OF BRIXTON, ENGLAND, ASSIGNOR TO HALL'S TRANSMISSION GEAR SYNDICATE, LIMITED, OF LONDON, ENGLAND.

FLUID-PRESSURE POWER-TRANSMISSION APPARATUS.

No. 803,584.     Specification of Letters Patent.     Patented Nov. 7, 1905.

Application filed March 14, 1903. Serial No. 147,706.

*To all whom it may concern:*

Be it known that I, JOHN WILLIAM HALL, engineer, of 15 Holland road, Brixton, in the county of Surrey, England, have invented certain new and useful Improvements in or Relating to Fluid-Pressure Power-Transmission Apparatus, of which the following is a specification.

This invention relates to hydraulic variable-transmission mechanism of the kind in which two sets of cylinders are employed and the variation in the drive is obtained by varying the capacity of one set of cylinders, the pistons of which are connected by rods or otherwise to a crank or its equivalent so carried that its throw can be varied from the maximum to zero, in which latter position it operates as a stud and imparts no movement to the pistons with which it is connected, while in the former position no driving action takes place. The cylinders, which in both sets correspond in number, are all carried in the body or casing of the mechanism, and the motor-cylinders when their pistons are moving to their full extent preferably have capacities equal to the pump-cylinders. Preferably motion is imparted to the mechanism through the casing from the source of power, which latter may be of any appropriate kind. Connecting-rods or their equivalent fixed to the pistons in the pump-cylinders engage with an eccentric or its equivalent on the driven member, which is preferably a shaft passing entirely through the gear and adapted to carry upon either or both of its ends the means by which the power is transmitted to its destination. This embodiment of gear is particularly applicable to high-power electric locomotives and will herein be described as so applied, it being understood that the invention is not limited to this particular application.

With reference to the accompanying drawings, which show, by way of example, particular ways in which the invention can be carried into effect, (but the details and general arrangement of the apparatus may be greatly modified without departing from the spirit of the invention,) Fig. 2 is a similar view of a modified construction; Fig. 5 is a detail view of the gearing between the gear-ring K and shaft $K^3$.

Like letters of reference indicate like parts in both constructions.

A is the driven shaft; B, the stationary frame, to which is conveniently connected the stator elements $S^0$ of the electric motor.

C is a support or trunnion which at one side supports the casing D, carrying the pump-cylinders D' and the motor or adjuster cylinders G.

E is a chamber for a controlling-valve F, placed between each pair of cylinders D' and G.

The internal shaft A, as above stated, extends entirely through the whole mechanism and is supported in bearings B' in the frame B. The transmission devices carried by the shaft A consist conveniently of two cranks A', set, preferably, at an angle of ninety degrees to each other and adapted to receive coupling-rods the other ends of which can take the crank-pins on the driving-wheels of the locomotive. However, any form of connecting-gear between the cranks A' and the locomotive-wheels may be employed—for example, spur-wheels or chain-wheels.

The stator elements $S^0$ of the electric motor are carried by the frame B, and the rotor elements $R^0$ are carried at or near each end of the casing D. The current for the motor can be taken up from a live rail in the well-known manner or can be generated on the locomotive by means of an internal-combustion engine driving a dynamo or in any other suitable manner.

The single-acting pump-cylinders D' are conveniently three in number, disposed radially at angles of one hundred and twenty degrees around the shaft A and having each a piston $D^2$, to which a connecting-rod $D^3$ is attached by a pin $D^4$ and engages with an eccentric or crank $A^2$ on the shaft A.

Each piston $D^2$ carries on its outer end a spring-loaded non-return valve $D^5$, and seated in a chamber or passage $D^8$ in a diaphragm $D^6$ is a similar valve $D^7$, operating in an opposite direction to the valve $D^5$. The cylinders D' are open at their inner ends to communicate with the interior of the casing D. The passage $D^8$ leads from the end of the pump-cylinder to the valve-chamber E, in which works the slide-valve F, controlling the supply of liquid between the cylinders D' and G, and this valve is operated by mechanism hereinafter described.

The valve F is hollow and connected to its operating-rod $F^2$ by a pin $F^3$. It is provided with ports or openings $F^4$ in its walls and also with an annular groove $F^5$. In the position shown the valve is in position to permit fluid to pass from one of the cylinders G by a port G' and through the ports $F^4$ into the interior of the valve, passing thereafter through the central opening $F^6$ therein and over the inner end of the valve back into the crank-chamber in the casing D.

The fluid supplied from one or other of the pumps is passed by the descent of the hollow piston $D^2$ from its lower or crank-chamber side through the valve $D^5$ to its upper side and on the return stroke of the piston is forced through the valve $D^7$ into an adjuster-cylinder G by way of the circulation-passage $G^2$, which extends entirely round the apparatus connecting the chambers $D^8$.

Figure 1:
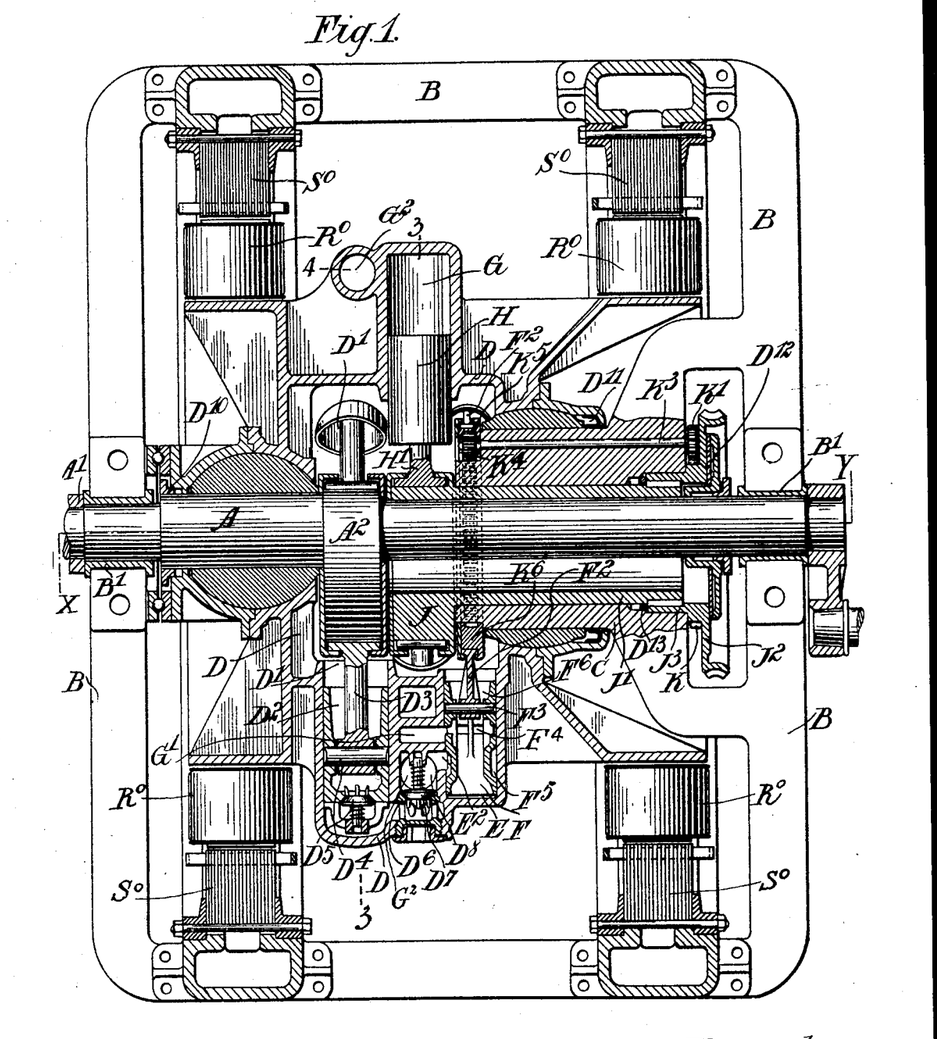
Figure 1 is a sectional plan of one embodiment of the gear in accordance with this invention.
Figures 2, 4, 5:
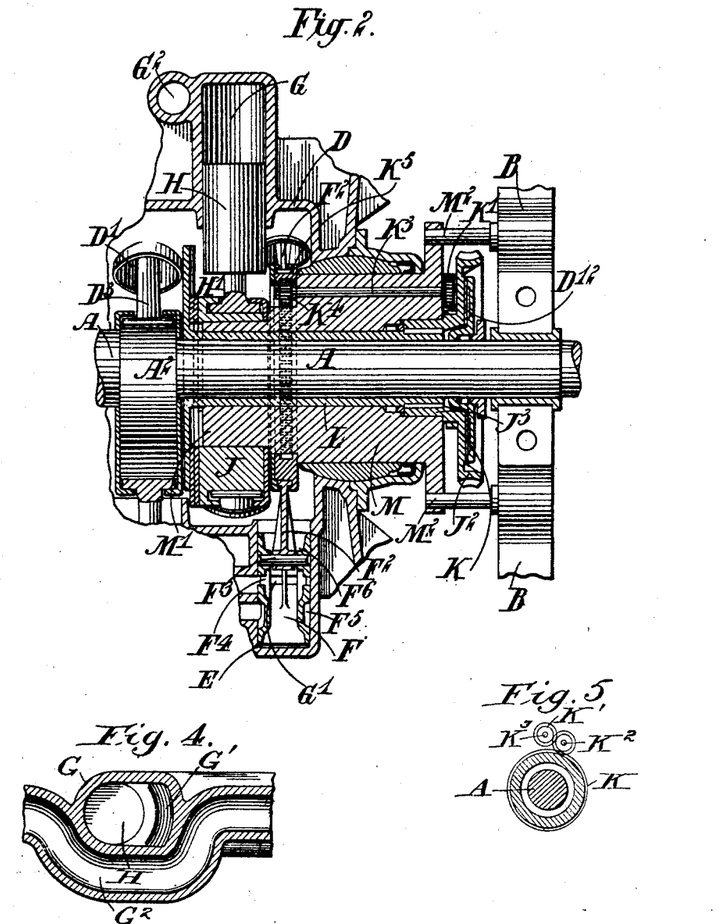
Figure 3:
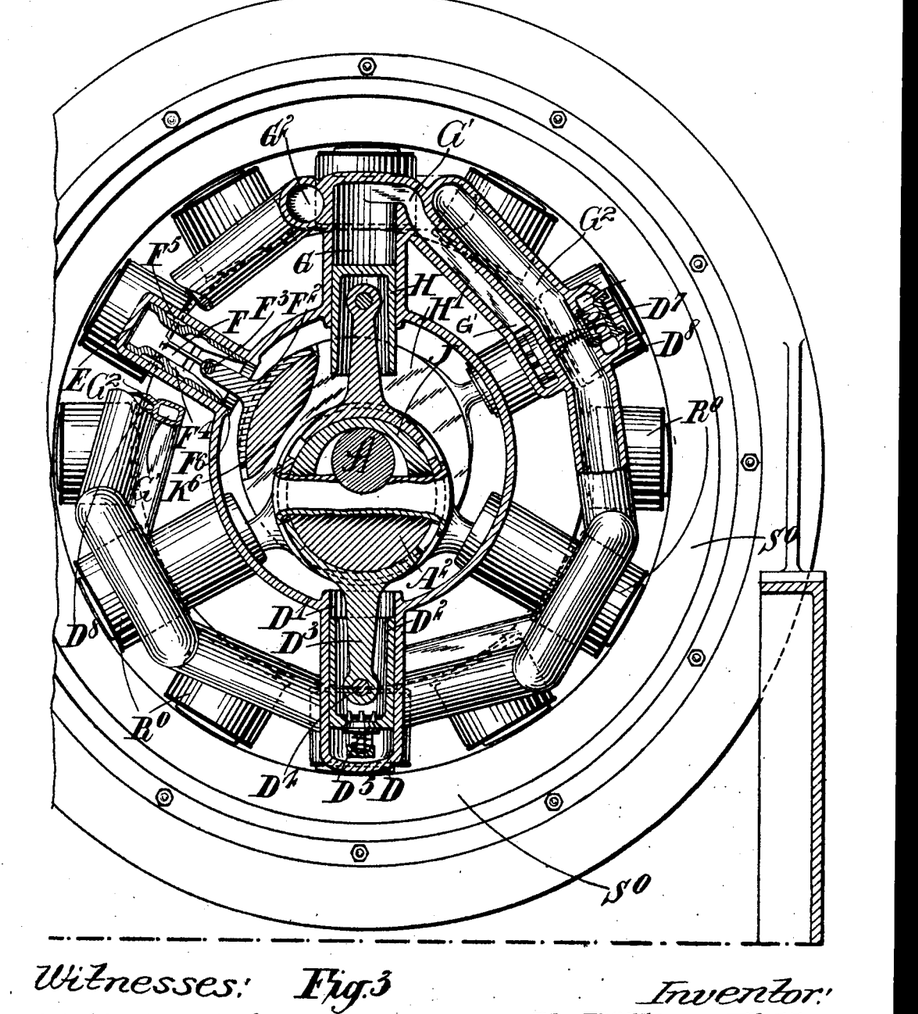
Fig. 3, a cross-section on an irregular line 3 3 in Fig. 1 through one each of the different pump and valve chambers of the hydraulic variable-transmission mechanism, and Fig. 4 a broken section on line 4 in Fig. 1.

The passage $G^2$ is, as shown more clearly in Figs. 3 and 4, continuous, and passages G', lying within passage $G^2$, extend from said passage at points adjacent to chambers $D^8$ and valves F to the adjacent adjuster-cylinders G. Passage $G^2$ lies between the pump and valve cylinders and only turns aside, as indicated in Figs. 1 and 4, to avoid the adjuster-cylinders. The view in Fig. 3 is from the left in Fig. 1. Each passage G' acts as a supply and exhaust passage for an adjuster-cylinder G, valve F connecting the same alternately with pressure-passage $D^8$ $G^2$ and the exhaust to the crank-chamber.

The power and speed adjuster cylinders G have a maximum capacity equal to that of the pump-cylinders D', and in each cylinder G is an adjuster-piston H, connected by a rod H' to a crank or eccentric J, carried on the end of a hollow shaft J'. This shaft J' is mounted so as to rotate eccentrically with regard to the general axis of rotation X Y of the apparatus within the trunnion or support C, carried on the frame B. The shaft J', which is bored for the passage of the shaft A, forms what for convenience will be hereinafter referred to as the "secondary" shaft and is normally prevented from rotating.

The eccentricity of the secondary shaft J' relatively to the axis of the trunnion C, which is also the axis of rotation of the apparatus, and the throw of the crank J relatively to the actual longitudinal axis of the secondary shaft J' are equal to each other, and therefore by rotating this shaft within its bearing in the trunnion C the radial distance of the crank-pin J from the axis of rotation X Y—that is to say, its effective throw—can be varied from the maximum distance to *nil*, the latter condition obtaining when the secondary shaft J' is so far rotated as to bring the axis of the crank-pin J into coincidence with the axis of rotation X Y. On the outer end of the shaft J' is keyed or otherwise fixed a worm-wheel $J^2$, adapted to be operated by a worm in the well-known manner, so as to rotate the shaft within its bearing, the worm-gearing also serving to prevent its accidental rotation. On the sleeve $J^3$ of the worm-wheel $J^2$ is mounted a gear-ring K, which is normally held to rotate in company with the wheel $J^2$ and through an idle pinion $K^2$ operates a pinion K', mounted on the end of a shaft $K^3$, which is carried in a bore in the trunnion C. On the other end of the shaft $K^3$ is mounted a pinion $K^4$, which is disposed in a recess in the trunnion C and gears with an internally-toothed ring $K^5$ on an eccentric $K^6$, to which are operatively connected the rods $F^2$ for operating the valves F.

The gearing between the worm-wheel $J^2$ and ring $K^6$ is such that for each movement of the wheel $J^2$ the ring is moved only half that distance—that is to say, when the wheel has been moved through its full distance of half a revolution to vary the stroke of the piston H the ring $K^6$ has only moved through a quarter of a revolution to provide the necessary adjustment of the valves F relatively to the port communicating with the cylinders and crank-chamber.

The direction of rotation of the driven member is reversed by rotating the casing D in the opposite direction when the casing is the driving member, and in order to permit this it is preferable to readjust the valves F. The adjustment of the valves F to put the mechanism in position for reversing requires to be made independent of the pistons H or the wheel $J^2$, and this is accomplished by rotating the shaft $K^3$ independently of the shaft J'. Various devices may be employed for this purpose—for example, by throwing the idle pinion $K^2$ out of gear or by disconnecting the ring K from the wheel $J^3$, or the adjustment may be made by rotating the shaft J' through an entire revolution, which, as above described, will cause the eccentric carrying the crank-rods $F^2$ to move through half a revolution.

The part of the casing D which forms a crank-chamber for the crank-pins $A^2$ and J is filled with a circulating fluid—say oil—and $D^{10}$, $D^{11}$, $D^{12}$, and $D^{13}$ are working joints packed by means of stuffing-boxes or otherwise to prevent a leakage of the circulating fluid. This fluid also fills the pump-cylinders D', the interior of the valve-chests E, in which the valves F operate, the outer ends of the adjuster-cylinders, and the circulation-passages, so that when the casing is rotated the pump-pistons $D^2$ shall circulate this fluid from the crank-chamber containing the crank-pins $A^2$ and J through the various passages. The casing rotates at one end on a suitable bearing on the shaft A and at the other end rotates on the shaft C.

When the casing D is rotated and the motion taken from the shaft A, any variations in speed the whole way from maximum down to nothing are obtained in a truly positive manner without any loss of power by simply varying the throw of the eccentric J, and therefore the capacity of the cylinders G—that is to say, the gear is a truly variable one, starting from nothing with a practically irresistible turning effort and gradually rising to full speed with a steady diminution of turning power till the lowest turning effort due to full speed is obtained.

The casing D turns about the axis of rotation X Y, and the pistons H and connecting-rods H' rotate about another axis which can, as above stated, be made eccentric to or concentric with the axis X Y in order that the pistons H shall have a variable reciprocatory movement relatively to the cylinders G, the amount of reciprocation being dependent upon the eccentricity of the crank-pin J to the axis of rotation X Y.

If the shaft J' be rotated so that the crank J is at full throw, and therefore the capacities of the cylinders G are equal to the pump-cylinders D', and assuming that a resistance is applied to the shaft A sufficient to cause it to resist the frictional turning power of the pump parts tending to turn it round, when the casing is rotated no driving action will be transmitted to the shaft, since the oil pressed out of one cylinder as the piston is forced into it merely passes into another cylinder of equal capacity, and therefore beyond any slight turning effort due to friction no useful results will be obtained. If, however, the crank J be turned into an intermediate position, which may be assumed to be half the throw of the eccentric, the stroke of the adjuster-pistons H will be reduced, and consequently the receiving capacity of the cylinders G will be lessened, so that they are no longer capable of receiving all the oil which the pump-pistons are endeavoring to force into them. This being the case and the driving effort on the casing being maintained so that it continues to rotate, the pump connecting-rods D³, exerting their power on the eccentric A² of the shaft A, force it round at a speed different from the speed of rotation of the casing and cylinders and, due to the amount of oil that has to be accommodated somewhere, between the two sets of cylinders. As this oil cannot be accommodated in the cylinders G, the shaft A, forming the abutment by which the pump-pistons D² are worked, gives way by turning round.

The power applied to the casing will set up a pressure in the cylinders D' and also a corresponding pressure in the cylinders G. As the leverage on the pistons in the cylinders G is only half the leverage on the pistons in the cylinders D', the tendency of the cylinders G to assist the rotation of the casing round in the same direction is only half that which is tending to hold it back at A. Therefore the power applied to the casing only requires to be half what would be necessary if the casing were not assisted by the pressure in the cylinders G. As, however, the power applied to the casing is constant, there is at A double what would otherwise be the case.

A further movement of the crank J and consequent reduction in the capacity of the cylinders G by the further entry therein of the pistons H causes the shaft A to move faster, and so on with each further rotation of the crank or eccentric J until the maximum speed is reached, when the receptive capacity of the cylinders G ceases, when the shaft and casing will rotate as one piece.

When the eccentric J is at its axis of rotation concentric with the axis X Y, then the cylinders G, having no operative leverage, cannot aid the rotation of the casing. Therefore the pump-cylinders cannot deliver any fluid, which, being practically incompressible, transmits the rotative effort of the casing D to the crank-pin A² through the pistons D² and connecting-rods D³, causing the shaft A to rotate at the full speed of the casing. In other words, the pump-cylinders being full of oil drawn from the crank-chamber and the receiving capacities of the adjuster-cylinders being lessened, the oil which cannot leak back to the crank-chamber through the pump-valves reacts on the pump-pistons and overcomes the resistance of the shaft A, which is thereby rotated at a speed which increases with each adjustment of the crank until the shaft A and casing D rotate as one. Obviously the maximum turning effort exists when the crank J is only very slightly less than at full eccentricity. It is to be noted that with this gear the pressure for equal power rises as the speed of the driven part falls.

A convenient modification of the apparatus is shown in Fig. 2, in which the shaft A passes through a bore in a shaft L, which in this construction is mounted concentric with the shaft A and carries at its outer end the worm-wheel J². Mounted concentrically on the shaft L is a bush or trunnion M, having at its inner end an eccentric M' and prevented from rotating by bolts M² or drag-links attached to the frame B and entering holes in a collar on the trunnion.

On the eccentric end M' of the trunnion is mounted the eccentric J, to which the connecting-rods H' of the adjuster-pistons H are connected, and this eccentric is operated by rotating this shaft L, to which it is connected by means of an Oldham coupling.

It is to be understood that the details above described may be greatly varied without departing from the spirit of the invention, all that is necessary being that the adjustable crank-pin J can be varied in position so as to impart the full movement or no movement at all to the piston which it controls.

When the mechanism is employed to rotate an axle or shaft requiring at one time or another that its opposite ends should rotate at different speeds, a balance-gear of any appropriate construction may be disposed within the crank or eccentric $A^2$. Conveniently the axle will then be made in two pieces, one of which is inclosed for part of its length within the other to form a bearing, both parts under normal conditions rotating as one. Two wheels of the balance-gear may be conveniently carried within the eccentric and the other wheels one on each part of the axle or shaft.

I claim—

1. In a power-transmitting device the combination of a shaft, extending entirely through the device, and a rotary casing, constituting the driving and driven members, a pressure-creating device, such as a pump, having one of its elements connected with the driven member and its coöperating element connected with the driving member, an adjuster in controllable communication with the pressure-creating device or pump and controlling the movement of the driven member with means for varying the relative capacities of the pressure-creating device or pump and the adjuster.

2. In a power-transmitting device the combination of a shaft, extending entirely through the device, and a rotary casing, constituting the driving and driven members, a pressure-creating device, such as a pump, having one of its elements connected with the driven member and its coöperating element connected with the driving member, an adjuster in controllable communication with the pressure-creating device or pump and controlling the movement of the driven member with means for varying the relative capacities of the pressure-creating device or pump and the adjuster, and a power device the rotor element of which is carried by one of said members of the transmitting device.

3. In a power-transmitting device, the combination of a rotary shaft, extending entirely through the device, and a rotary casing, constituting the driving and driven members, a pressure-creating device such as a pump having one of its elements connected with the driven member and its coöperative element connected with the driving member, an adjuster in controllable communication with the pressure-creating device or pump and controlling the movement of the driven member with means for varying the relative capacities of the pressure-creating device or pump and the adjuster, a magnetic rotor element on one of said members and a magnetic stator element coacting therewith.

4. In a power-transmitting mechanism the combination of a rotary shaft, extending entirely through the device, and a rotary working-fluid casing constituting the driving and driven members, a fluid-pressure-creating device such as a pump one element of which is operatively connected with the shaft and the coöperating element of which is movable and connected with the casing, a fluid-pressure adjuster, in controllable communication with said pressure-creating device, the parts of which adjuster are relatively adjustable to vary its mechanical advantage and possessing an element operatively connected to and movable in unison with the said coöperating element of the pressure-creating device, whereby a given torque set up by the driving member can be transformed into torque of different values exerted upon the driven member, by the joint connection of the pressure-creating device and adjuster and the body of working fluid within them.

5. In a power-transmitting mechanism the combination of a rotary shaft, extending entirely through the device, and a rotary working-fluid casing constituting the driving and driven members of a fluid-pressure-creating device such as a pump, one element of which is operatively connected with the shaft and the coöperating element of which is movable and connected with the casing, a fluid-pressure adjuster in controllable communication with the pressure-creating device, the parts of which adjuster are relatively adjustable to vary its mechanical advantage and possessing an element operatively connected to and movable in unison with the said coöperating element of the pressure-creating device, whereby a given torque set up by the driving member can be transformed into torque of different values exerted upon the driven member, by the joint connection of the pressure-creating device and adjuster and the body of working fluid within them, and a power device having a rotor element and a stator element to coact therewith substantially as described.

6. In a power-transmitting mechanism the combination of a rotary shaft, extending entirely through the device, a rotary working-fluid casing, a pressure-creating device such as a pump, one element of which is operatively connected with the shaft and the coöperating element of which is movable and connected with the casing, a fluid-pressure adjuster having two coöperating elements one of its elements being connected with the casing, a relatively fixed but adjustable crank-shaft with which the other element of the adjuster is operatively connected, and a duct or ducts connecting the pump and adjuster.

7. In a power-transmitting mechanism the combination of a rotary shaft, extending entirely through the device, a rotary working-fluid casing, a pressure-creating device such as a pump, one element of which is operatively connected with the shaft and the coöperating element of which is movable and connected with the casing, a fluid-pressure adjuster having two coöperating elements one of its elements being connected with the casing, a relatively fixed but adjustable crank-shaft with which the other element of the adjuster is operatively connected, a duct or ducts connecting the pump and adjuster, a magnetic rotor element on said casing and a magnetic stator element coacting therewith substantially as described.

8. In a power-transmitting mechanism the combination of a rotary shaft, extending entirely through the device, a rotary casing, a pressure-creating device such as a pump one element of which is operatively connected with the shaft and the coöperating element of which is movable and connected with the casing, a fluid-pressure adjuster having two coöperating elements one of its elements being connected with the casing, a relatively fixed but adjustable crank-shaft with which the other element of the adjuster is operatively connected, a duct or ducts connecting the pump and adjuster, and a power device having a rotor element on said casing and a stator element coacting therewith substantially as described.

9. In a power-transmitting mechanism the combination of a rotary shaft, extending entirely through the device, a rotary casing, a fluid-pressure-creating device, such as a pump, one element of which is operatively connected to the shaft and the coöperating element of which is movable and connected with the casing, a fluid-pressure adjuster having two coöperating elements, one of its elements being connected with the casing, a relatively fixed but adjustably-movable crank-shaft with which the other element of the adjuster is operatively connected, a duct extending from the pump to the adjuster and a controlling-valve in the duct.

10. In a power-transmitting mechanism the combination of a rotary shaft, extending entirely through the device, a rotary casing, a fluid-pressure-creating device such as a pump one element of which is operatively connected to the shaft and the coöperating element of which is movable and connected with the casing, a fluid-pressure adjuster having two coöperating elements, one of its elements being connected with the casing, a relatively fixed but adjustably-movable crank-shaft with which the other element of the adjuster is operatively connected, a duct extending from the pump to the adjuster a controlling-valve in the duct, a magnetic rotor element on the casing and a magnetic stator element coacting therewith, substantially as described.

11. In a power-transmitting mechanism the combination of a rotary shaft, extending entirely through the device, a rotary casing, a fluid-pressure-creating device such as a pump one element of which is operatively connected to the shaft and the coöperating element of which is movable and connected with the casing, a fluid-pressure adjuster having two coöperating elements, one of its elements being connected with the casing, a relatively fixed but adjustably-movable crank-shaft with which the other element of the adjuster is operatively connected, a duct extending from the pump to the adjuster, a controlling-valve in the duct, a power device having a rotor element on the casing and a stator element coacting therewith, substantially as described.

12. In a power-transmitting mechanism the combination of a rotary liquid-holding casing, a rotary shaft extending entirely through the device, a pump-piston, a cylinder therefor, an adjuster-cylinder, a piston therefor, said casing having a conduit connecting the pump-cylinder and the adjuster-cylinder and rotating around a given axis, a fluid-power-transmitting agent in said cylinders and conduits, whereby the driving-piston drives the liquid and by liquid-pressure exerts force against the casing, the traverse of one of said pistons being adjustable to vary the movement of the liquid, substantially as described.

13. In a power-transmitting mechanism the combination of a rotary shaft extending entirely through the device, a pump-piston, a cylinder therefor, an adjuster-cylinder, a piston therefor, a liquid-holding casing having a conduit connecting the pump-cylinder and the adjuster-cylinder and rotating around a given axis, a magnetic rotor element $R^\circ$, a magnetic stator element $S^\circ$ to coact therewith, a fluid-power-transmitting agent in said cylinders and conduits whereby the driving-piston drives the liquid and by liquid-pressure exerts force against the casing, the traverse of one of said pistons being adjustable to vary the movement of the liquid, substantially as described.

14. In a power-transmitting mechanism the combination of a rotary shaft, extending entirely through the mechanism, a pump-piston, a cylinder therefor, an adjuster-cylinder, a piston therefor, a liquid-holding shell having a conduit connecting the cylinders and rotating around a given axis, a power device having a rotor element and a stator element to coact therewith, a fluid-power-transmitting agent in the cylinders and conduits, whereby the driving-piston drives the liquid and by liquid-pressure exerts force against the shell the traverse of one of said pistons being adjustable to vary the movement of the liquid, substantially as described.

15. In a power-transmitting mechanism the combination of a plurality of companion driving-pistons and a separate cylinder for each, all connected to rotate in unison, a plurality of separate adjuster-cylinders rotating in unison with the pump-cylinders, a piston for each adjuster-cylinder, conduits extending from the driving-cylinders to the adjuster-cylinders a distribution-valve for each adjuster-cylinder, and a shaft extending entirely through the mechanism.

16. In a power-transmitting mechanism the combination of a plurality of companion driving-pistons and a separate cylinder for each, all connected to rotate in unison, a plurality of separate adjuster-cylinders rotating in unison with the pump-cylinders, a piston for each adjuster-cylinder, conduits extending from the driving-cylinders to the adjuster-cylinders a distribution-valve for each adjuster-cylinder, a shaft extending entirely through the mechanism, a magnetic rotor element $R^\circ$ and a magnetic stator element $S^\circ$ coacting therewith, substantially as described.

17. In a power-transmitting mechanism the combination of a plurality of companion driving-pistons and a separate cylinder for each, all connected to rotate in unison, a plurality of separate adjuster-cylinders rotating in unison with the pump-cylinders, a piston for each adjuster-cylinder conduits extending from the driving-cylinders to the adjuster-cylinders a distribution-valve for each adjuster-cylinder, a shaft extending entirely through the mechanism, and a power device having a rotor element and a coacting stator element, substantially as described.

18. In a power-transmitting mechanism in which the power-transmitting agent is a fluid, the combination with a series of reciprocatory driving-pistons of a rotary shaft extending entirely through the mechanism and operatively connected with the pistons, cylinders for the pistons, a series of reciprocatory adjuster-pistons, cylinders for the adjuster-pistons, having a maximum capacity equal to the pump-cylinders, by varying which capacity the speed can be varied from maximum to nothing, and a single rotary shell integral with and connecting all of said cylinders and having ducts connecting said cylinders.

19. In a power-transmitting mechanism in which the power-transmitting agent is a fluid, the combination with a series of reciprocatory driving-pistons of a rotary shaft extending entirely through the mechanism and operatively connected with the pistons, cylinders for the pistons, a series of reciprocatory adjuster-pistons, cylinders for the adjuster-pistons, having a maximum capacity equal to the pump-cylinders, by varying which capacity the speed can be varied from maximum to nothing, a single rotary shell integral with and connecting all of said cylinders and having ducts connecting said cylinders, a magnetic rotor element and a magnetic stator element coacting therewith, substantially as described.

20. In a power-transmitting mechanism in which the power-transmitting agent is a fluid the combination with a series of reciprocatory driving-pistons, of a shaft extending entirely through the mechanism and operatively connected with the pistons, cylinders for the pistons, a series of reciprocatory adjuster-pistons, cylinders for the adjuster-pistons, having a maximum capacity equal to the pump-cylinders, by varying which capacity the speed can be varied from maximum to nothing, a single rotary shell integral with and connecting all of said cylinders and having ducts connecting said cylinders, and means for rotating the shell, substantially as described.

21. In a power-transmitting mechanism in which the power-transmitting agent is a fluid, the combination with a series of reciprocatory driving-pistons, of a cranked shaft extending entirely through the mechanism and operatively connected with the pistons, cylinders for the pistons, a series of reciprocatory adjuster-pistons, cylinders for the adjuster-pistons of equal maximum capacity to the pump-cylinders, an adjustable crank with which the pistons of the adjuster-cylinders are connected, and a single rotary shell integral with and connecting all of said cylinders and having ducts connecting said cylinders.

22. In a power-transmitting mechanism in which the power-transmitting agent is a fluid, the combination with a series of reciprocatory driving-pistons, of a cranked shaft extending entirely through the mechanism and operatively connected with the pistons, cylinders for the pistons, a series of reciprocatory adjuster-pistons, cylinders for the adjuster-pistons, an adjustable crank with which the pistons of the adjuster-cylinders are connected, a single rotary shell integral with and connecting all of said cylinders and having ducts connecting said cylinders, a magnetic rotor element on said shell and a magnetic stator element coacting therewith.

23. In a power-transmitting mechanism in which the power-transmitting agent is a fluid, the combination with a series of reciprocatory driving-pistons of a cranked shaft extending entirely through the mechanism and opertively connected with the pistons, cylinders for the pistons, a series of reciprocatory adjuster-pistons, cylinders for the adjuster-pistons, an adjustable crank with which the pistons of the adjuster-cylinders are connected, a single rotary shell integral with and connecting all of said cylinders and having ducts connecting said cylinders and a power device having a rotor element on said shell and a stator element coacting therewith.

24. In a power-transmitting mechanism in which the power-transmitting agent is a fluid, the combination of a reciprocatory driving-piston and a reciprocatory adjuster-piston and cylinders of equal capacities, for said pistons, a single rotary shell integral with and connecting the cylinders of said pistons and having ducts for the passage of fluid between the cylinders and between the casing and the cylinders, a shaft extending entirely through the mechanism and beyond each side of the shell, and a distribution-valve for controlling the passage of fluid, substantially as described.

25. In a power-transmitting mechanism in which the power-transmitting agent is a fluid, the combination of a reciprocatory driving-piston and a reciprocatory adjuster-piston and cylinders of equal capacities, for said pistons, a single rotary shell integral with and connecting the cylinders of said pistons and having ducts for the passage of fluid between the cylinders and between the casing and the cylinders, a shaft extending entirely through the mechanism and beyond each side of the shell, a magnetic rotor element on the shell and a magnetic stator element coacting therewith, and a distribution-valve for controlling the passage of fluid, substantially as described.

26. In a power-transmitting mechanism in which the power-transmitting agent is a fluid, the combination of a reciprocatory driving-piston and a reciprocatory adjuster-piston and cylinders having equal capacities for said pistons, a single rotary shell integral with and connecting the cylinders of said pistons and having ducts for the passage of fluid between the cylinders and between the casing and the cylinders, a shaft extending entirely through the mechanism and beyond each side of the shell, a power device having a rotor element and a coacting stator element and a distribution-valve for controlling the passage of fluid through the cylinders, substantially as described.

27. In a power-transmitting apparatus the combination of a rotary driving-casing, a driven shaft extending entirely through the mechanism and beyond each side of the casing, a pump operatively connected with the shaft, an adjuster communicating with the pump and having one of its elements connected with the casing, an adjustable crank-shaft with which the coöperating element of the adjuster is connected, and a valve controlling the passage of fluid from the pump to the adjuster.

28. In a power-transmitting apparatus the combination of a rotary driving-casing, a driven shaft extending entirely through the mechanism and beyond each side of the casing and a pump operatively connected with the shaft, an adjuster communicating with the pump and having one of its elements connected with the casing, an adjustable crank-shaft with which the coöperating element of the adjuster is connected, a valve controlling the passage of fluid from the pump to the adjuster, an eccentric controlling the operation of the valve, and a connection between the crank-shaft and the eccentric whereby the correlation of the valve with the adjuster is maintained.

29. In a power-transmitting apparatus the combination of a rotary driving-casing, a driven shaft extending entirely through the mechanism and beyond each side of the casing and a pump operatively connected with the shaft, an adjuster communicating with the pump and having one of its elements connected with the casing, an adjustable crank-shaft with which the coöperating element of the adjuster is connected, a valve controlling the passage of fluid from the pump to the adjuster, an eccentric controlling the operation of the valve, a connection between the crank-shaft and the eccentric whereby the correlation of the valve with the adjuster is maintained, a magnetic rotor element on the casing and a magnetic stator element coacting therewith substantially as described.

30. In a power-transmitting apparatus the combination of a rotary driving-casing, a driven shaft extending entirely through the mechanism and beyond each side of the casing, a pump operatively connected with the shaft, an adjuster communicating with the pump and having one of its elements connected with the casing, an adjustable crank-shaft with which the coöperating element of the adjuster is connected, a valve controlling the passage of fluid from the pump to the adjuster, an eccentric controlling the operation of the valve, a connection between the crank-shaft and the eccentric whereby the correlation of the valve with the adjuster is maintained, and a power device having a rotor element on said casing and a stator element coacting therewith substantially as described.

31. In a power-transmitting device the combination of a cranked driven shaft extending entirely through the device, means at both ends of the shaft for transmitting the power to its destination, a rotary casing, a pressure-creating device, such as a pump, having one of its elements connected with the casing and its coöperating element connected with the shaft, and an adjuster actuated by the pressure-creating device or pump and controlling the movement of the driven member with means for varying the relative capacities of the pressure-creating device or pump and the adjuster to vary the speed from maximum to nothing.

32. In a power-transmitting apparatus the combination of a cranked driven shaft extending entirely through the apparatus and adapted to transmit the power to its destination from both its ends, a relatively fixed crank-shaft a rotary casing having pump and adjuster-cylinders of equal maximum capacity therein, a circulating system including the pump, adjuster-cylinder, and center of the casing, and pump and adjuster-pistons connected respectively with the cranked driven shaft and the relatively fixed crank-shaft.

33. In a power-transmitting apparatus the combination of a cranked driven shaft extending entirely through the apparatus and adapted to transmit the power to its destination from both its ends, a relatively fixed crank-shaft a rotary casing having pump and adjuster-cylinders therein, a circulating system including the pump, adjuster-cylinder, and center of the casing, pump and adjuster-pistons connected respectively with the cranked driven shaft and the relatively fixed crank-shaft, a magnetic rotor element $R^0$ and a magnetic stator element $S^0$ to coact therewith.

34. In a power-transmitting apparatus, the combination of a cranked driven shaft extending entirely through the apparatus and adapted to transmit the power to its destination from both its ends, a relatively fixed crank-shaft, a rotary casing having pump and adjuster-cylinders therein, a circulating system including the pump, adjuster-cylinder, and center of the casing, pump and adjuster-pistons connected respectively with the cranked driven shaft and the relatively fixed crank-shaft, and a power device having a rotor element on the casing and a stator element coacting therewith.

35. In a power-transmitting apparatus the combination of a cranked shaft extending entirely through the apparatus, a pump operated by the shaft, a power and speed adjuster, an adjustable crank with which one of the elements of the adjuster is connected, and a system of ducts connecting the pump and adjuster.

36. In a power-transmitting apparatus the combination of a cranked shaft extending entirely through the apparatus, a pump operated by the shaft, a power and speed adjuster, an adjustable crank with which one of the elements of the adjuster is connected, a system of ducts connecting the pump and adjuster, a magnetic rotor element and a magnetic stator element coacting therewith substantially as described.

37. In a power-transmitting apparatus the combination of a cranked shaft extending entirely through the apparatus, a pump operated by the shaft, a power and speed adjuster, an adjustable crank with which one of the elements of the adjuster is connected, a system of ducts connecting the pump and adjuster, a power device having a rotor element and a stator element coacting therewith, substantially as described.

38. In a power-transmitting apparatus the combination of a rotary casing and a cranked shaft extending entirely through the apparatus beyond each side of the casing both being arranged in coincident axial alinement, a pump, and a power and speed adjuster in said casing, a connection between one of the pump elements and the shaft, an adjustable crank and a connection between one of the adjuster elements and the adjustable crank, a valve controlling the passage of fluid from the pump to the adjuster, an eccentric for operating said valve, and a connection between said eccentric and said adjuster-crank.

39. In a power-transmitting apparatus the combination of a rotary casing, a cranked shaft extending entirely through the apparatus beyond each side of the casing both being arranged in coincident axial alinement, a pump, and a power and speed adjuster in said casing, a connection between one of the pump elements and the shaft, an adjustable crank and a connection between one of the adjuster elements and the adjustable crank, a valve controlling the passage of fluid from the pump to the adjuster, an eccentric for operating said valve, a connection between said eccentric and said adjuster-crank, a magnetic rotor element on the casing and a magnetic stator element coacting therewith substantially as described.

40. In a power-transmitting apparatus the combination of a rotary casing, a cranked shaft extending entirely through the apparatus beyond each side of the casing, both being arranged in coincident axial alinement, a pump and a power and speed adjuster in said casing, a connection between one of the pump elements and the shaft, an adjustable crank, a connection between one of the adjuster elements and the adjustable crank, a valve controlling the passage of fluid from the pump to the adjuster, an eccentric for operating said valve a connection between said eccentric and said adjuster-crank, and a power device having a rotor element and a stator element to coact therewith substantially as described.

41. In a power-transmitting apparatus the combination of a casing, a shaft extending entirely through the apparatus and beyond each side of the casing, both arranged in coincident axial alinement, a pump and power and speed adjuster in said casing, a connection between one of the pump elements and the shaft, an adjustable crank, a connection between one of the adjuster elements and the adjustable crank, a valve controlling the passage of fluid from the pump to the adjuster, an eccentric for operating said valve, and an operating mechanism for the valve controlled by the movement of the adjustable crank.

42. In a power-transmitting apparatus the combination of a casing, a shaft extending entirely through the apparatus and beyond each side of the casing, both arranged in coincident axial alinement, a pump and power and speed adjuster in said casing, a connection between one of the pump elements and the shaft, an adjustable crank, a connection between one of the adjuster elements and the adjustable crank, a valve controlling the passage of fluid from the pump to the adjuster, an eccentric for operating said valve, an operating mechanism for the valve controlled by the movement of the adjustable crank, a magnetic rotor element on the casing and a magnetic stator element coacting therewith.

43. In a power-transmitting apparatus the combination of a casing, a shaft extending entirely through the apparatus and beyond each side of the casing, both arranged in coincident axial alinement, a pump and power and speed adjuster in said casing, a connection between one of the pump elements and the shaft, an adjustable crank and a connection between one of the adjuster elements and the adjustable crank, a valve controlling the passage of fluid from the pump to the adjuster, an eccentric for operating said valve, and operating mechanism for the valve controlled by the movement of the adjustable crank, and a power device having a rotor element on the casing and a stator element to coact therewith.

44. In a power-transmitting apparatus the combination of a rotary fluid-holding casing, a cranked shaft extending entirely through the mechanism and beyond each side of the casing, both arranged in coincident axial alinement, a pump and a power and speed adjuster in said casing, a connection between one of the pump elements and the shaft, a second shaft an adjustable crank on the second shaft in the casing, a connection between one of the adjuster elements and the adjustable crank a valve controlling the passage of fluid from the pump to the adjuster, an eccentric for operating said valve, a connection between the valve-operating mechanism and the adjustable crank-operating mechanism, the valve-eccentric being adjustable relatively to the adjustable crank.

45. In a power-transmitting apparatus the combination of a rotary fluid-holding casing, a cranked shaft extending entirely through the mechanism and beyond each side of the casing both arranged in coincident axial alinement, a pump and a power and speed adjuster in said casing, a connection between one of the pump elements and the shaft, a second shaft an adjustable crank on the second shaft in the casing, a connection between one of the adjuster elements and the adjustable crank, a valve controlling the passage of fluid from the pump to the adjuster, an eccentric for operating said valve, a connection between the valve-operating mechanism and the adjustable crank-operating mechanism, the valve-eccentric being adjustable relatively to the adjustable crank, a magnetic rotor element on the casing and a magnetic stator element coacting therewith, substantially as described.

46. In a power-transmitting apparatus the combination of a rotary casing, a cranked shaft extending entirely through the mechanism and beyond each side of the casing, both arranged in coincident axial alinement, a pump and a power and speed adjuster in said casing, a connection between one of the pump elements and the shaft, an adjustable crank, a connection between one of the adjuster elements and the adjustable crank, a valve controlling the passage of fluid from the pump to the adjuster, an eccentric for operating said valve, a connection between the valve-operating mechanism and the adjustable crank-operating mechanism, a power device having a rotor element connected with the casing and a stator element to coact therewith, substantially as described.

47. In a power-transmitting apparatus the combination of a rotary casing, a cranked shaft extending entirely through the casing, a pump in said casing having its piston connected with the shaft, an adjuster in said casing embodying a piston, an adjustable crank connected with the adjuster-piston, fluid-circulating passages connecting the pump and the adjuster and the center of the casing, a valve controlling the passage of fluid from the pump to the adjuster, an eccentric for operating the valve, and connections between the said eccentric and the adjuster-crank.

48. In a power-transmitting apparatus the combination of a rotary casing, a cranked shaft extending entirely through the casing, a pump in said casing having its piston connected with the shaft, an adjuster in said casing embodying a piston, an adjustable crank connected with the adjuster-piston, fluid-circulating passages connecting the pump and the adjuster and the center of the casing, a valve controlling the passage of fluid from the pump to the adjuster, an eccentric for operating the valve, connections between the said eccentric and the adjuster-crank, a magnetic rotor element on the casing and a magnetic stator element coacting therewith.

49. In a power-transmitting apparatus the combination of a rotary casing, a cranked shaft extending entirely through the casing, a pump in said casing having its piston connected with the shaft, an adjuster in said casing embodying a piston, an adjustable crank connected with the adjuster-piston, fluid-circulating passages connecting the pump and the adjuster and the center of the casing, a valve controlling the passage of fluid from the pump to the adjuster, an eccentric for operating the valve, connections between the said eccentric and the adjuster-crank, and a power device having a rotor element on the casing and a stator element to coact therewith.

50. In a power-transmitting mechanism the combination of a rotary casing, a cranked shaft extending entirely through the casing, a fluid-pressure-creating device such as a pump, one element of which is operatively connected with the casing and a coöperative element of which is movable and connected with the shaft, a fluid-pressure power and speed adjuster having one of its elements connected with the casing, a coöperating element of the adjuster, a relatively fixed but adjustable crank-shaft with which the coöperating element of the adjuster is connected, a valve controlling the passage of motive fluid from the pump to the adjuster, an eccentric controlling the operation of said valve, a pivot-pin on which the eccentric is rotatable, and a connection between the adjuster crank-shaft and the eccentric, whereby the angular advance of the eccentric is maintained constan in relation to the virtual crank of the adjuster.

51. In a power-transmitting mechanism the combination of a rotary casing, a cranked shaft extending entirely through the casing, a fluid-pressure-creating device such as a pump, one element of which is operatively connected with the casing and the coöperative element of which is movable and connected with the shaft, a fluid-pressure power and speed adjuster having one of its elements connected with the casing, a coöperating element of the adjuster, a relatively fixed but adjustable cranked shaft with which the coöperating element of the adjuster is connected, a valve controlling the passage of motive fluid from the pump to the adjuster, an eccentric controlling the operation of said valve, a pivot-pin on which the eccentric is rotatable, a connection between the adjuster crank-shaft and the eccentric whereby the angular advance of the eccentric is maintained constant in relation to the virtual crank of the adjuster, a magnetic rotor element on the casing and a magnetic stator element coacting therewith.

52. In a power-transmitting mechanism the combination of a rotary casing, a cranked shaft extending entirely through the casing, a fluid-pressure-creating device such as a pump, one element of which is operatively connected with the casing and a coöperative element of which is movable and connected with the shaft, a fluid-pressure power and speed adjuster having one of its elements connected with the casing, a coöperating element of the adjuster, a relatively fixed but adjustable crank-shaft with which the coöperating element of the adjuster is connected, a valve controlling the passage of motive fluid from the pump to the adjuster, an eccentric controlling the operation of said valve, a pivot-pin on which the eccentric is rotatable, a connection between the adjuster crank-shaft and the eccentric, whereby the angular advance of the eccentric is maintained constant in relation to the virtual crank of the adjuster, and a power device having a rotor element on the casing and a coacting stator element.

53. In a power-transmitting mechanism the combination of a rotary casing and a shaft extending entirely through the casing, a fluid-pressure-creating device such as a pump, one element of which is operatively connected with the casing and the coöperating element of which is movable and connected with the shaft, a fluid-pressure power and speed adjuster having one of its elements connected with the casing, a coöperating element of the adjuster, a relatively fixed but adjustable crank-shaft with which the said coöperating element of the adjuster is connected, a valve controlling the passage of motive fluid from the pump to the adjuster, an eccentric controlling the operation of said valve, a pivot-pin on which the eccentric is rotatable, and an operative connection between the adjuster crank-shaft and the eccentric substantially as described.

54. In a power-transmitting mechanism the combination of a rotary casing a shaft extending entirely through the casing, a fluid-pressure-creating device such as a pump, one element of which is operatively connected with the casing and the coöperating element of which is movable and connected with the shaft, a fluid-pressure power and speed adjuster having one of its elements connected with the casing, a coöperating element of the adjuster, a relatively fixed but adjustable crank-shaft with which the said coöperating element of the adjuster is connected, a valve controlling the passage of motive fluid from the pump to the adjuster, an eccentric controlling the operation of said valve, a pivot-pin on which the eccentric is rotatable, an operative connection between the adjuster crank-shaft and the eccentric, and means at both ends of the shaft for transmitting the power to its destination, substantially as described.

55. In a power-transmitting mechanism the combination of a rotary casing and a shaft extending entirely through the casing, of a fluid-pressure-creating device such as a pump, one element of which is operatively connected with the casing and the coöperating element of which is movable and connected with the shaft, a fluid-pressure power and speed adjuster having one of its elements connected with the casing, a coöperating element of the adjuster, a relatively fixed but adjustable crank-shaft with which the said coöperating element of the adjuster is connected, a valve controlling the passage of motive fluid from the pump to the adjuster, an eccentric controlling the operation of said valve, a pivot-pin on which the eccentric is rotatable, an operative connection between the adjuster crank-shaft and the eccentric, a magnetic rotor element attached to the casing and a magnetic stator element coacting therewith substantially as described.

56. In a power-transmitting device the combination of a rotary casing, a cranked shaft extending entirely through the casing and centrally thereof, means at both ends of the shaft for transmitting the power to its destination, a pump-cylinder, an adjuster-cylinder having the same capacity as the pump-cylinder, a coöperating element for the pump connected with the shaft, means for varying the relative capacities of the pressure-creating cylinder and the adjuster, a valve for controlling the passage of fluid to and from the cylinders and the center of the casing and means for rotating the casing substantially as described.

57. In a power-transmitting mechanism the combination of a rotary casing a shaft extending entirely through the casing, a fluid-pressure-creating device, such as a pump, one element of which is operatively connected with the shaft and the coöperating element of which is movable and connected with the casing, a fluid-pressure power and speed adjuster having one of its elements connected with the casing, a coöperating element of the adjuster, a relatively fixed but adjustable crank-shaft with which that coöperating element of the adjuster is connected a valve controlling the passage of motive fluid from the pump to the adjuster, an internally-toothed eccentric ring controlling the operation of the valve, a pinion gearing with the teeth of said ring, an operating-shaft for the said pinion, and an operative connection between the adjuster crank-shaft and the pinion-operating shaft, substantially as described.

58. In a power-transmitting mechanism, the combination of a rotary casing a shaft extending entirely through the casing, a fluid-pressure-creating device, such as a pump, one element of which is operatively connected with the shaft and the coöperating element of which is movable and connected with the casing, a fluid-pressure power and speed adjuster having one of its elements connected with the casing, a coöperating element of the adjuster, a relatively fixed but adjustable crank-shaft with which that coöperating element of the adjuster is connected, a valve controlling the passage of motive fluid from the pump to the adjuster, an internally-toothed eccentric ring controlling the operation of the valve, a pinion gearing with the teeth of said ring, an operating-shaft for the pinion, an operative connection between the adjuster crank-shaft and the pinion-operating shaft, and a power device having a rotor element on the casing and a coacting stator element, substantially as described.

59. In a power-transmitting mechanism, the combination of a rotary casing, a shaft extending entirely through the casing, a fluid-pressure-creating device, such as a pump, one element of which is operatively connected with the shaft and the coöperating element of which is movable and connected with the casing, a fluid-pressure power and speed adjuster having one of its elements connected with the casing, a coöperating element of the adjuster, a relatively fixed but adjustable crank-shaft with which the said coöperating element of the adjuster is connected, a valve controlling the passage of motive fluid from the pump to the adjuster, an internally-toothed eccentric ring controlling the operation of the valve, a pinion gearing with the teeth of said ring, an operating-shaft for the pinion, and an operative connection between the adjuster crank-shaft and the pinion-operating shaft.

60. In a power-transmitting mechanism the combination of a rotary casing, a shaft extending entirely through the casing, a fluid-pressure-creating device, such as a pump, one element of which is operatively connected with the shaft and the coöperating element of which is movable and connected with the casing, a fluid-pressure power and speed adjuster having one of its elements connected with the casing, a coöperating element of the adjuster, a relatively fixed but adjustable crank-shaft with which the said coöperating element of the adjuster is connected, a valve controlling the passage of motive fluid from the pump to the adjuster, an internally-toothed eccentric ring controlling the operation of the valve, a pinion gearing with the teeth of said ring, an operating-shaft for the pinion, and an operative connection between the adjuster crank-shaft and the pinion-operating shaft.

61. In a power-transmitting mechanism the combination of a rotary casing, a shaft extending entirely through the casing, a fluid-pressure-creating device, such as a pump, one element of which is operatively connected with the shaft and the coöperating element of which is movable and connected with the casing, a fluid-pressure power and speed adjuster having one of its elements connected with the casing, a coöperating element of the adjuster, a relatively fixed but adjustable crank-shaft with which that coöperating element of the adjuster is connected, a valve controlling the passage of motive fluid from the pump to the adjuster, an internally-toothed eccentric ring controlling the operation of the valve, a pinion gearing with the teeth of said ring, an operating-shaft for the pinion, an operative connection between the adjuster crank-shaft and the pinion-operating shaft, an electric rotor element attached to the casing, and a stator element coacting therewith, substantially as described.

In testimony whereof I have signed my name to this specification in the presence of two subscribing witnesses.

JOHN WILLIAM HALL.

Witnesses:
HAROLD WADE,
HARRY BRIDGE.